(12) United States Patent
Meyer (10) Patent No.: US 10,099,857 B2
(45) Date of Patent: *Oct. 16, 2018

(54) CALENDER STACK AND METHOD FOR PRODUCING A FILM FROM THERMOPLASTICS

(71) Applicant: REIFENHÄUSER GMBH & CO. KG MASCHINENFABRIK, Troisdorf (DE)

(72) Inventor: Helmut Meyer, Troisdorf (DE)

(73) Assignee: Reifenhauser GmbH & Co. KG Maschinenfabrik, Troisdorf (DE)

( * ) Notice: Subject to any disclaimer, the term of this patent is extended or adjusted under 35 U.S.C. 154(b) by 276 days.

This patent is subject to a terminal disclaimer.

(21) Appl. No.: 14/653,725

(22) PCT Filed: Dec. 20, 2013

(86) PCT No.: PCT/EP2013/077626
§ 371 (c)(1),
(2) Date: Jun. 18, 2015

(87) PCT Pub. No.: WO2014/096329
PCT Pub. Date: Jun. 26, 2014

(65) Prior Publication Data
US 2015/0328806 A1     Nov. 19, 2015

(30) Foreign Application Priority Data

Dec. 21, 2012  (EP) .................................... 12199014

(51) Int. Cl.
*B29C 43/24* (2006.01)
*B29C 43/58* (2006.01)
(Continued)

(52) U.S. Cl.
CPC ............ *B65G 13/02* (2013.01); *B29C 43/245* (2013.01); *B29C 43/58* (2013.01);
(Continued)

(58) Field of Classification Search
CPC ....... B29C 43/24; B29C 43/245; B29C 43/46; B29C 43/58; B29C 2043/5825
See application file for complete search history.

(56) References Cited

U.S. PATENT DOCUMENTS 1,989,038 A * 1/1935 Brown ................. B29C 43/245
                                                 100/169
2,861,504 A * 11/1958 Kane ..................... D21G 1/002
                                                 100/163 A
(Continued)

FOREIGN PATENT DOCUMENTS

DE  10 2005 042 442 A1   3/2007
DE  10 2007 052 812 A1   5/2009
(Continued)

OTHER PUBLICATIONS

Japanese Office Action for Japanese Patent Application No. 2015-548626, dated Jul. 26, 2017, (9 pages).

*Primary Examiner* — James P Mackey
(74) *Attorney, Agent, or Firm* — Pauley Erickson & Kottis (57) ABSTRACT

A calender stack including at least two rollers between which a nip can be formed. The ends of the rollers are supported in rotary fashion in bearings and one of the rollers is stationary and at least one other roller is embodied as an advancing roller and has a first adjusting system by which it is possible to move the bearings of the advancing roller, thus changing the nip. The advancing roller has a respective adjusting system on each of its two bearings and associated with each first adjusting system, a second adjusting system is provided, by which it is possible to adjust an axial offset of the advancing roller relative to the stationary roller.

18 Claims, 7 Drawing Sheets

(51) Int. Cl.
 *B65G 13/02* (2006.01)
 *B29L 7/00* (2006.01)
 *B29K 101/12* (2006.01)

(52) U.S. Cl.
 CPC .. *B29C 2043/5825* (2013.01); *B29K 2101/12* (2013.01); *B29L 2007/008* (2013.01)

(56) References Cited

U.S. PATENT DOCUMENTS

| | | | | |
|---|---|---|---|---|
| 3,273,199 A | * | 9/1966 | Kleinewefers | ....... B01D 35/005 100/158 C |
| 4,434,713 A | * | 3/1984 | Hartwich | ............... D21G 1/002 100/168 |
| 7,484,950 B2 | * | 2/2009 | Mizunuma | ............ B29C 43/222 425/140 |
| 8,287,267 B2 | * | 10/2012 | Sano | ...................... B29C 43/22 425/363 |
| 9,284,122 B2 | * | 3/2016 | Meyer | ................... B29C 43/245 |
| 2009/0295017 A1 | | 12/2009 | Sano et al. | |

FOREIGN PATENT DOCUMENTS

| | | |
|---|---|---|
| EP | 2 581 192 A1 | 4/2013 |
| JP | S49-44586 | 11/1974 |
| JP | H10-264194 | 10/1998 |
| JP | 2000-271950 A | 10/2000 |

\* cited by examiner

CALENDER STACK AND METHOD FOR PRODUCING A FILM FROM THERMOPLASTICS

BACKGROUND OF THE INVENTION

Field of the Invention

This invention relates to a calender stack, including at least two rollers, the at least two rollers mounted in a housing, between which a nip can be formed, and the ends of the rollers are supported in rotary fashion in bearings and one of the rollers is stationary and at least one other roller is an advancing roller and has a first adjusting system by which the bearings of the advancing roller can be moved, thus changing the nip.

Discussion of Related Art

Calender stacks of this kind are used, for example, in the manufacture of plastic sheets and plates. A molten mass produced in an extrusion process, after emerging from a sheet die, is guided through an adjustable calender nip between the rollers. The molten mass is cooled in the process and shaped so that a sheet web is produced with a uniform thickness and a homogeneous appearance across the entire sheet surface. So-called calendered sheets of this kind are made, for example, of polystyrene, polypropylene, or polyester and are used among other things for transporting and protecting foods and are also used in the automotive industry.

A calender stack normally includes at least two rollers, one of which is stationary and at least one other roller is embodied as an advancing roller. This advancing roller can be moved by an adjusting system so that different calender nip settings can be produced between the stationary roller and the adjustable one. In this way, it is possible to produce sheets of different thicknesses.

Because of numerous interfering influences, for example inevitable roller deflections that also become more evident with increasing dimensions of the rollers, it can be difficult to ensure a uniform desired thickness of the film produced in the calender stack across its entire width. Consequently, attempts have already been made to measure the thickness of the film across its width and to produce a thickness profile. Subsequently, based on the determined thickness profile, influence can be exerted on the thickness profile of the molten mass supplied to the calender stack in order to counteract the undesirable effects that are caused by the roller deflection. It is thus possible to change the outlet opening of a sheet die in accordance with the thickness measurement profile in order to match the thickness profile of the resulting film as constantly as possible to a predetermined setpoint value. This entails a high degree of control complexity, which is considered disadvantageous.

SUMMARY OF THE INVENTION

One object of this invention is to provide a calender stack and a method for producing a film from thermoplastics in which it is possible to easily compensate for deviations of the thickness profile of the film produced, such as due to roller deflections.

The above and other objects of this invention are achieved with a calender stack with features and modifications as described in this specification and in the claims.

According to this invention, the advancing roller has a respective adjusting system at each of its two bearings, with which the nip can be adjusted and each first adjusting system is associated with a second adjusting system by which it is possible to adjust an axial offset of the adjusting roller relative to the stationary roller. Consequently, in order to compensate for inevitable roller deflections, the calender stack according to this invention can make it possible to support an advancing roller so that it can be offset relative to a stationary roller that cannot be offset. In other words, the idealized centerlines of these two rollers, which simultaneously form their rotation axes, then no longer extend parallel, but are instead slightly offset from each other, thus making it possible to adjust a constant gap between the two rollers, independent of any deflection.

According to one embodiment of this invention, the second adjusting system is situated so that it is rotated by 90° relative to the first adjusting system so that the offsetting of the advancing roller takes place in a plane that extends perpendicular to the plane in which the adjustment of the nip is carried out.

The adjusting systems used in the context of this invention are not subject to any general restriction, but they should permit the most play-free possible adjustment of the nip and of the axial offset of the advancing roller.

According to one embodiment of this invention, thus the first and/or second adjusting system has a rack and a pinion, which engages with the teeth of the rack and can be driven in rotary fashion by a motor. The distance between the pinion and the rack can be changed by changing the tooth engagement depth between them.

In particular, a rack engages a bearing of the advancing roller and cooperates with a motor-drivable pinion so that the rotating motion of the motor and pinion is converted into a linear motion of the rack and thus a linear motion of the bearing of the advancing roller. Depending on the rotation direction of the motor, the advancing roller can be moved toward or away from a stationary roller in order to change the nip and/or an axial offset can be adjusted relative to the stationary roller. The corresponding sets of teeth of the rack and pinion can be embodied to enable a very precise setting of the adjustment path. It is thus possible to convert minimal adjustment paths in the µm range.

Due to the adjustability of the distance between pinion and rack, of this invention, it is possible to adjust the tooth engagement depth between these two engaged parts of the first and second adjusting device. Usually, the tooth engagement depth between a pinion and a corresponding rack is set to a predetermined dimension, which, because of the then prevailing tooth flank play, ensures the freedom of motion of the pinion teeth in the teeth of the rack when the pinion is rotated by the associated motor. But if, for example, after reaching the desired position, the depth of the tooth engagement increases because of the distance between the pinion and the rack is correspondingly reduced, then the existing tooth flank play is also reduced and in the ideal case, almost completely eliminated.

This invention uses the above-described effect to ensure ease of adjustment by the intrinsically advantageous rack-and-pinion system and to eliminate the play in the adjusting device. In this way, the play in experiments was reduced to less than 1/100 mm, for example, to produce a slight prestressing force.

If it becomes necessary to change the nip or the axial offset again, the tooth engagement depth and the accompanying tooth flank play can first be changed by increasing the distance between the pinion and the rack back to a usual distance and then, the pinion can be rotated in order to travel the desired adjustment path, after which the process of eliminating the play begins anew.

But because an adjustment is only required infrequently, the adjusting device can also be used to perform a long-lasting adjustment because even with the play eliminated, an adjustment is still possible.

In an alternative embodiment of this invention, the pinion and the motor are mounted on the housing with the interposition of a replaceable spacer plate so that the thickness of the spacer plate defines the distance between the pinion and the rack. By selecting a thickness of the spacer plate or by carrying out a corresponding remachining of this plate, such as by mechanical material removal, it is possible to eliminate the play inside adjusting devices by the desired amount.

According to one embodiment of this invention, the distance between the pinion and the rack can be changed by a cam mechanism which engages the pinion and which when actuated, such as by a hand crank or a controllable drive unit, produces the desired change in the distance of the pinion from the rack.

It is also possible for the distance between the pinion and the rack to be releasably fixable in order to ensure stable adjustment states. In this way, it is also possible to produce a prestressing of the pinion in relation to the rack in order to completely eliminate the play between them. They can also have suitable coatings, such as a PVD coating, in order to minimize friction and wear, for example.

According to one embodiment of this invention, the rack and the pinion are embodied with a helical gearing in order to provide larger flank support areas. In addition, a helical gearing increases the so-called overlap ratio, which has a positive influence on the transmission of motion. In addition, the rack can be hardened, ground, and honed in order to achieve a favorable degree of durability and precision.

According to one embodiment of this invention, the first and/or second adjusting systems are centrally controllable so that it is possible to produce a very precise parallel travel of the roller and to thus achieve an adjustment of a nip with uniform dimensions across the entire length of the roller and thus an adjustment of the axial offset.

According to another embodiment of this invention, a transmission is provided between the pinion and the motor of the first and/or second adjusting system. With such a transmission, it is possible, for example, to introduce a speed transformation into the drive. In a preferred embodiment of this invention, the transmission is embodied in the form of a planetary gear with a high torsional stiffness and a relatively low flank play.

According to one embodiment of this invention, the motor driving the pinion is a servomotor. In addition to a compact design, servomotors feature a very good regulating behavior and make it possible to approach a target position with a precision down to the micrometer.

In another embodiment of the calender stack according to this invention, three rollers are provided, two of which are embodied as advancing rollers and are preferably situated diametrically opposite the stationary roller. With such an arrangement, it is possible for two nips to be adjusted and for a sheet web that is to be calendered, for example, to be guided through the two calender nips in succession, thus making it possible to achieve particularly good results in the calendaring process. At least one of the advancing rollers can also be axially offset according to this invention relative to the fixed roller, preferably the roller, which, together with the stationary roller, forms the first nip through which the molten mass is guided.

One method according to this invention for producing a film from thermoplastics is based on the use of a calender stack that has already been described above, in which the thermoplastics are supplied in the form of a molten mass to the calender stack with at least two rotating rollers whose spacing distance from each other can be adjusted in a first plane, between which a nip is formed that is adjustable as a function of the spacing distance between the rollers, and the molten mass is guided through the nip and thus shaped into the film and cooled.

According to one object of this invention, in order to compensate in particular for fluctuations in the thickness profile of the film due to roller deflection, it is possible to measure the thickness of the produced film across its width and to establish a thickness measurement profile of the film, which is compared to a predetermined setpoint value and, depending on the measured deviation of the thickness measurement profile from the setpoint value, to offset one of the rollers in a second plane with regard to its rotation axis relative to the rotation axis of the other roller that opposes it in the nip, which second plane extends perpendicular to the first plane.

The magnitude of the offsetting to be carried out on the first roller can be calculated by a system control in a way that will be explained in greater detail below on the basis of measurement values from the thickness measurement profile of the film and carried out on the roller through a corresponding control of its adjusting systems.

According to one embodiment of this invention, the ends of the rollers are supported in rotary fashion in bearings, and the one roller is embodied as an advancing roller and the other roller is embodied as stationary and when the advancing roller is offset out of a home position, in which the rotation axes of the advancing roller and the stationary roller extend parallel to each other, the bearings of this roller are moved in opposite directions from each other in the second plane. In this connection, a respective travel distance of the bearings of ±30 mm, in particular ±25 mm, is considered sufficient.

BRIEF DESCRIPTION OF THE DRAWINGS

This invention is explained in greater detail below in view of exemplary embodiments and with reference to the accompanying drawings, wherein:

FIG. 5b shows the side view of the device according to FIG. 5a;

DETAILED DESCRIPTION OF THE INVENTION

Figure 1:
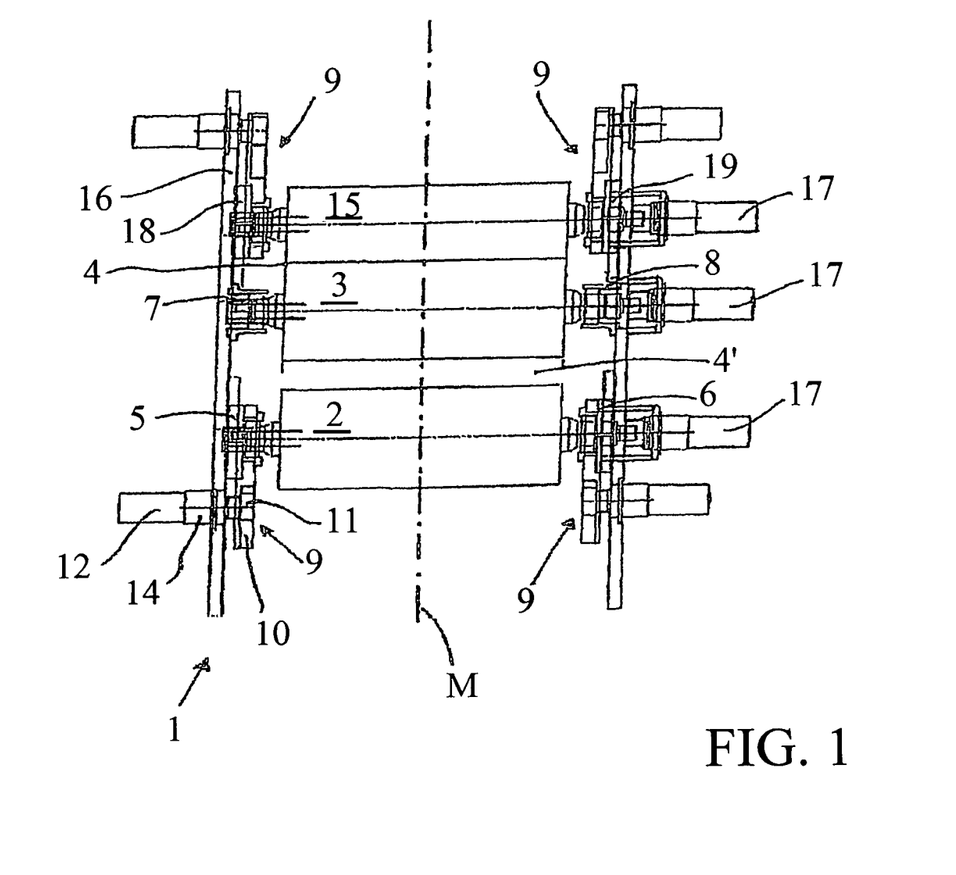
FIG. 1 is a schematic top view of a calender stack according to this invention.
Figure 2:
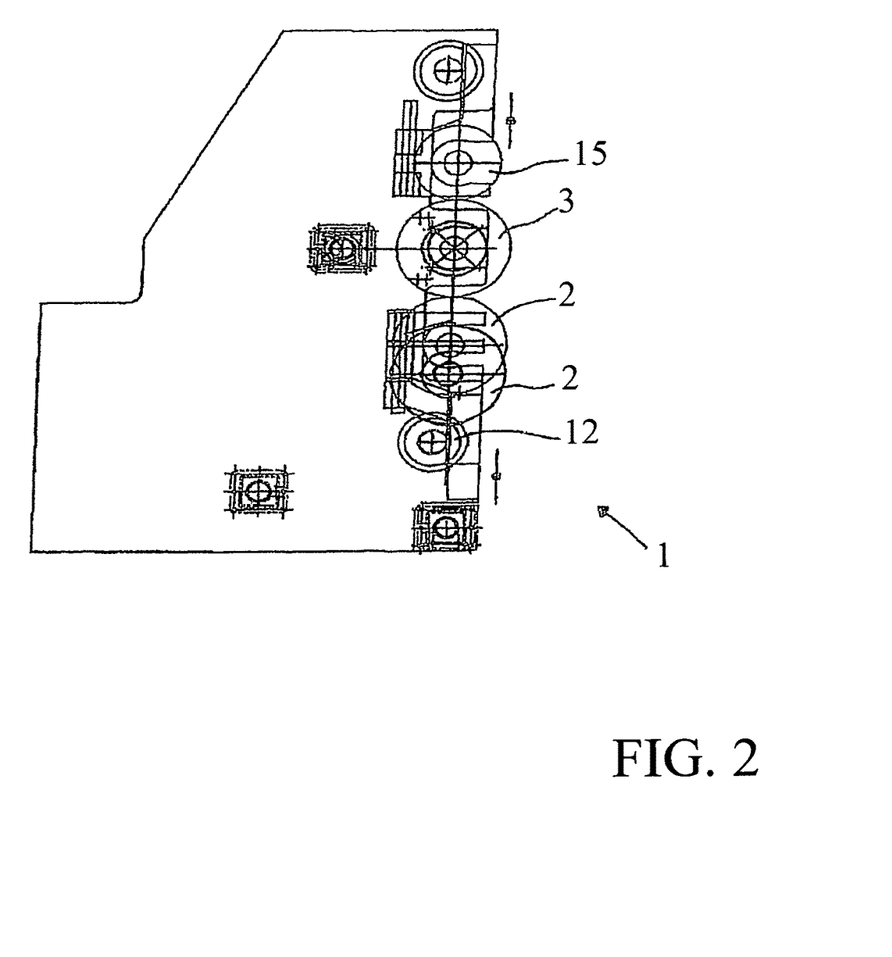
FIG. 2 is a schematic side view of the calender stack shown in FIG. 1.

FIGS. 1 and 2 show a roller frame of a calender stack, labeled as a whole with the element numeral 1, of a calender stack, which includes three parallel rollers 2, 3, 15 that are mounted in a frame 16. All three rollers 2, 3, 15 are mounted to the frame 16 at their ends by respective bearings 5, 6, 7, 8, 18, 19 in which they are supported in rotary fashion. Each of the three rollers 2, 3, 15 has its own drive motor 17 by which it can be set into rotation.

The roller 3 located in the middle is a stationary roller while the two rollers 2, 15 are embodied in the form of or as advancing rollers. The two advancing rollers each has or is equipped with a respective adjusting system 9 at each end, with which the respective bearings 5, 6, 18, 19, together with the rollers 2, 15 mounted in them, can be moved along the frame 16 in linear fashion.

By moving the bearings 5, 6, 18, 19, it is possible to adjust a nip 4 between the rollers 2 and 3 and a nip 20 between the rollers 3 and 15.

The following description of the design and function of the adjusting system 9 is limited to the adjusting system 9 for moving the bearing 5 of the roller 2 shown at the bottom left in FIG. 1. Due to the symmetry of the design of the roller frame, this same description also applies in corresponding fashion to the adjusting system 9 located at the other end of roller 2 and for the two adjusting systems 9 that control the position of the roller 15.

The adjusting system 9 has a rack 10 and a pinion 11 cooperating with this rack. The rack 10 engages with the bearing 5. With a servomotor 12 and an interposed planetary gear 14, the pinion 11 can be driven into rotation, thus causing the rack 10 and together with it, the bearing 5 to be moved in linear fashion and guided by the support structure 16. Depending on the rotation direction of the servomotor 12, the movement travels toward or away from the stationary roller 3. Through the use of a servomotor, it is thus possible to approach a desired position with a high degree of precision.

In order to be able to move and position the roller 2 so that it is exactly parallel to the stationary roller 3, the adjusting systems 9 for producing the advancing motion of the two bearings 5 and 6 are driven synchronously.

As soon the advancing rollers 2, 15 have executed the desired travel path in response to the above-explained actuation of the adjusting system 9, and the nip in relation to the stationary roller 3 has been set to the desired dimension, in order to ensure the most constant possible product quality, each of the adjustable rollers must be supported in as play-free a fashion as possible in order to maintain the nip at the desired dimension even when there is contact pressure between the rollers.

Figure 3:
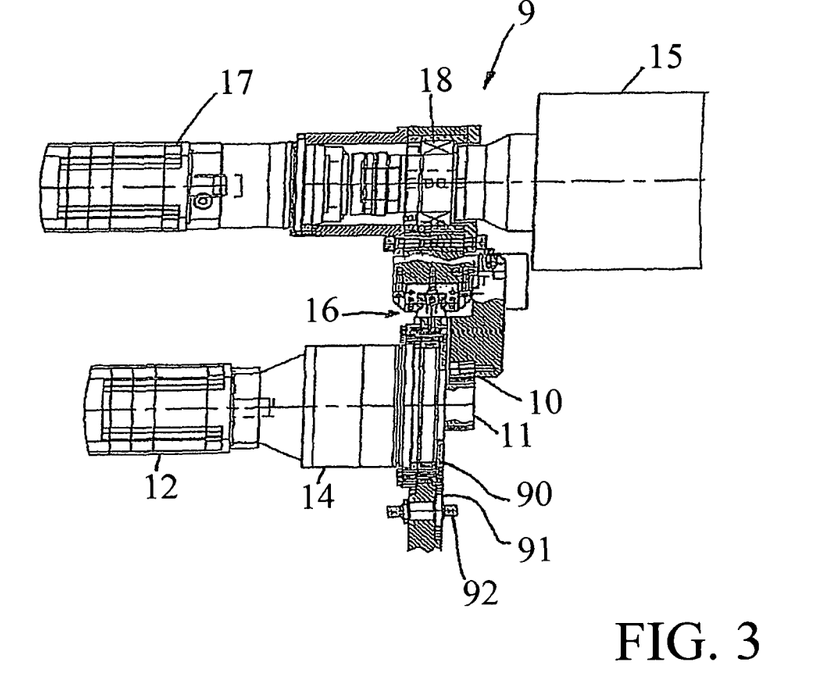
FIG. 3 is a view of a part of the calender stack according to this invention.

For this purpose, the servomotor 12 with its planetary gear 14 and the pinion 11 rotary driven by it, as shown in FIG. 3, are supported in a cam mechanism comprising an annular cam 90 with external gearing and a pinion 91 that engages in the external gearing and which, for example through engagement of a rotating tool (not shown) or suitable drive motor with the pin 92, can be turned around its own axis and as a result of the tooth engagement, then causes the cam 90 to rotate, so to speak.

Figure 4:
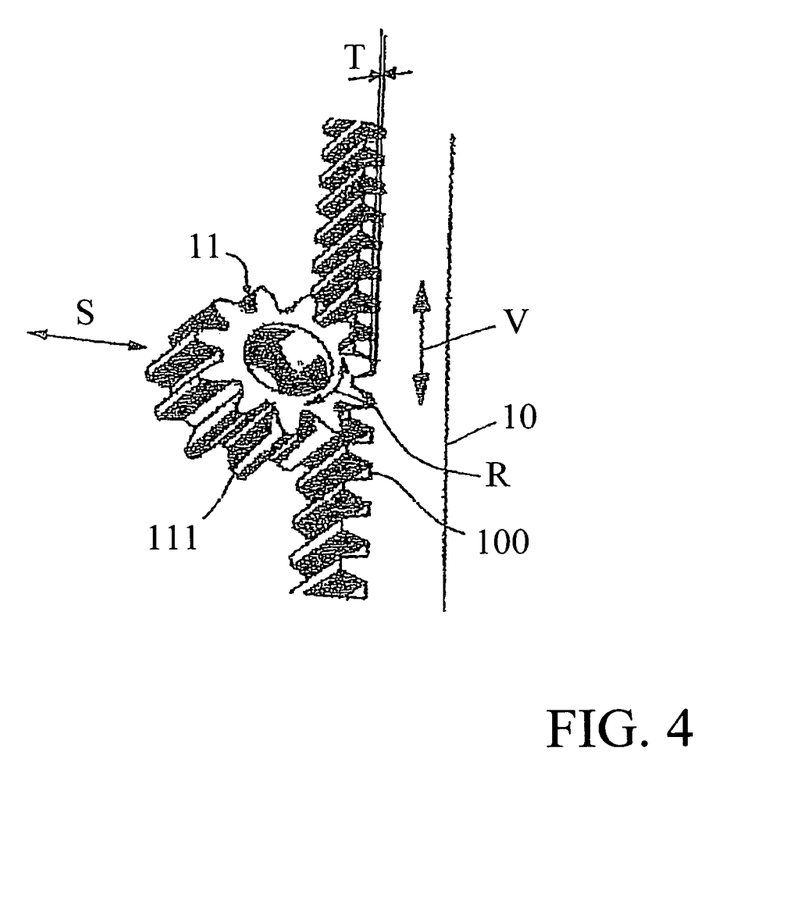
FIG. 4 is a schematic view of the principal according to this invention for reducing tooth flank play.

As shown by the schematic view in FIG. 4, when the cam 90 is actuated in the one or the other rotation direction, this produces a movement of the pinion 11 that engages with the rack 10, into or away from the tooth root surface 100 of the rack 10, which movement is indicated by the arrow S in FIG. 4.

Consequently, when the actuation of the cam 90 causes the pinion 11 to be moved toward the right in the direction of arrow S, the tooth engagement depth of the pinion teeth 111 of the pinion 11 in the rack 10 increases, thus correspondingly reducing the distance T between the pinion 11 and the rack 10. The tooth flank play between the pinion 11 and the rack 10 also decreases correspondingly so that an almost complete freedom from play can be set between the pinion 11 and the rack 10.

If it becomes necessary to actuate the adjusting system 9 again in order to change the nip between the advancing roller 2, 15 and the stationary roller 3, then first the cam 90 is rotated by the pinion 91 so that a movement of the pinion 11 toward the left in the direction S according to the depiction in FIG. 4 is produced, as a result of which the increasing distance T between the pinion 11 and the rack 10 reduces the tooth engagement depth between the pinion 11 and the rack 10 until there is once again a sufficient amount of tooth flank play to permit easy rotation of the pinion 11 in the direction of the arrow R and as a reaction, a traveling movement in direction V. As soon as the new desired nip has been adjusted in this way, the cam 90 is once again actuated in order to once more reduce the tooth engagement depth to the minimum possible.

Alternatively, the tooth flank play can also be long-lastingly adjusted to a minimum and kept there since even then, it is still possible for the pinion 11 to move in the rack 10. The low set rack play, however, permits a highly precise adjustment of the nip.

When manufacturing calender stack sheets, a flow of molten mass produced in a plasticizing unit and emerging from a sheet die is guided into a calender stack according to FIG. 1 and in it, is first guided around the roller, then threaded through the nip 4, then guided under the roller 3, through the nip 4', and around the roller 2. The calender stack is usually followed by a winder, in which the finished sheet is rolled up. The rollers 2, 3, 15 of the calender stack are cooled in order to cool the flow of molten mass.

In the situation or embodiment shown in FIG. 1, the nip 4' is opened wide, which facilitates the initial threading of a flow of molten mass to be calendered. As soon as the flow of molten mass has been guided around the rollers 2, 3, 15 and threaded through the nips 4, 20, the nips 4, 4' can be reduced by moving the bearings 5, 6, 18, 19 in the above-described way, except for a preset dimension required for the respective calendering process. Such a narrow setting of the calender nip is demonstrated by the example of the nip 4 in FIG. 1. In the side view in FIG. 2, roller 2, which is embodied as an advancing roller, is shown in two positions situated apart from each other, resulting from corresponding movements.

With a roller frame according to this invention, equipped with or having a servomotor and a planetary gear, depending on the roller type used, holding forces of up to 500,000 N and movement forces of up to 100,000 N, can be exerted. The travel paths that can be produced in this way typically lie between 150 mm and 200 mm, with a positioning precision of between 5 µm and 1 µm.

One advantage of the roller frame according to this invention, equipped with the electromechanical adjusting system, lies primarily in the exact controllability and simpler operation as compared to a hydraulic system. In addition, the electromechanical system has a more compact design and experiences a lower amount of wear. Because of the precise positionability of the advancing rollers enabled by the system according to this invention, it is in particular possible to dispense with additional measuring and adjusting devices for readjusting the nip so that the use of the electromechanical system also brings economic advantages.

Figure 5A:
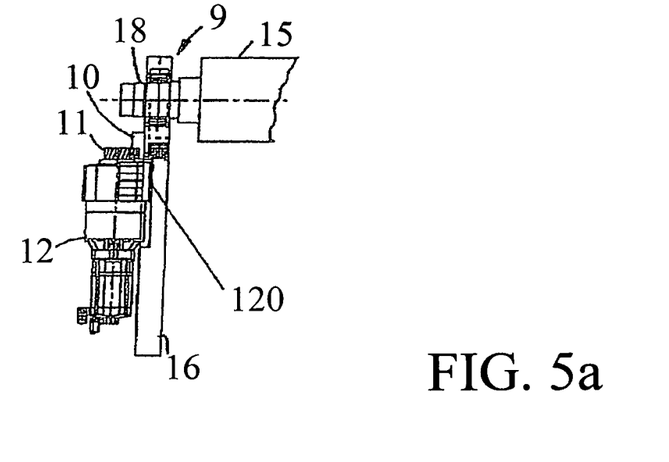
FIG. 5a shows an alternative embodiment of the calender stack according to this invention, in a view similar to that according to FIG. 3.
Figure 5B:
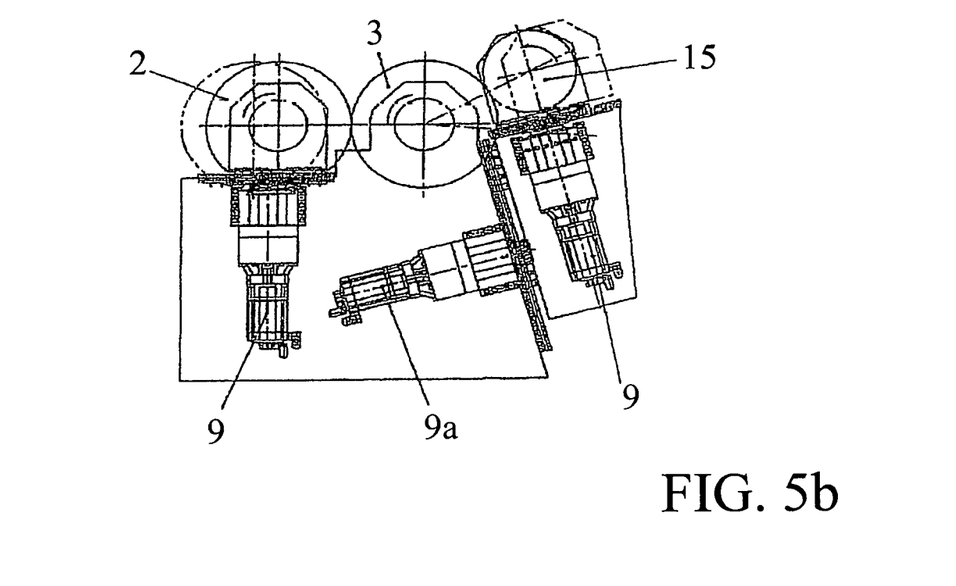

In the exemplary embodiment according to FIGS. 5a and 5b, the motor 12 that drives the pinion 11 is mounted on the housing 16 with the interposition of a replaceable spacer plate 120. The thickness of the spacer plate 120 defines the distance between the pinion 11 and the rack 10 and thus the tooth engagement depth at which the pinion teeth of the pinion 11 engage in the rack 10.

If the thickness of the spacer plate 120 is then changed, such as by replacing and/or machining it, then the distance between the pinion 11 and the rack 10 and thus the amount of flank play change. The thinner the spacer plate 120 is, the smaller is this corresponding play. It is thus possible to adjust the tooth flank play to the most optimum possible minimum.

Also, it is clear from FIG. 5b that in the exemplary embodiment shown, the two advancing rollers 2, 15 are each equipped with an adjusting system 9, but the advancing roller 15 is also equipped with a second adjusting system 9a that is rotated by 90° relative to the adjusting system 9 and can be used to adjust an axial crosswise orientation for the stationary roller 3 in order to compensate for the deflection of the roller.

Figure 6:
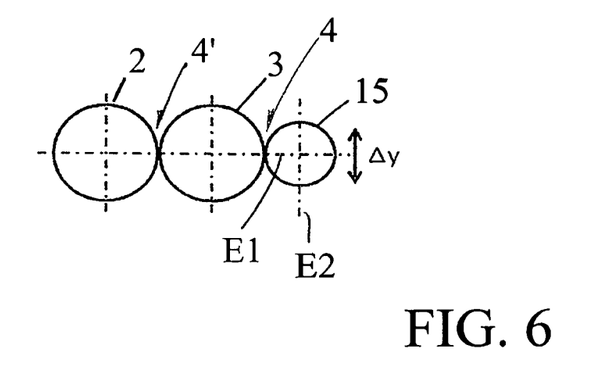
FIG. 6 schematically shows the roller arrangement of the calender stack according to this invention.

In the context of producing a film from thermoplastics, as schematically shown in FIG. 6, the molten mass emerging from a sheet die that is not shown here first travels into the nip 4 between the advancing roller 15 and the stationary roller 3 before it is conveyed via the stationary roller 3 to the second nip 4' between the additional advancing roller 2 and the stationary roller 3 and from there, exits the calender stack according to FIG. 6 once more.

Figure 8:
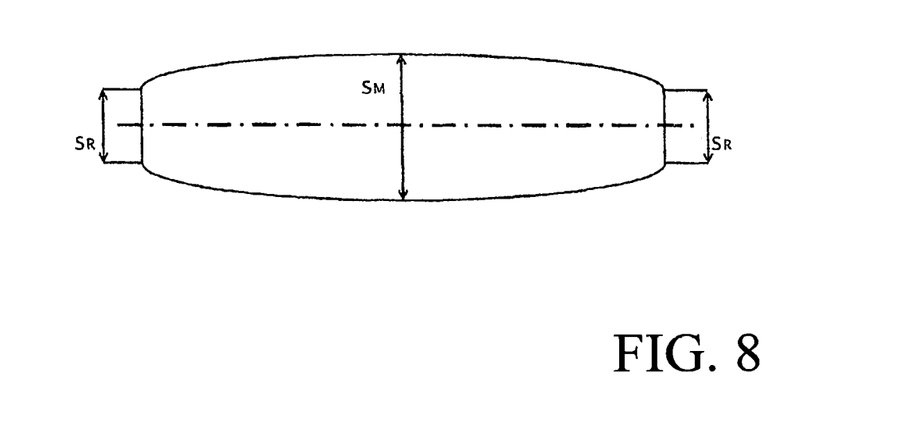
FIG. 8 shows a thickness profile of a film that is produced.

Due to the inevitable deflection of the rollers 15, 3, which cooperate to form the nip 4, a thickness profile across the width of the obtained film is produced, which is shown in FIG. 8.

Based on the intrinsically desired predetermined thickness value, which is only achieved at the edge of the film and which is labeled $S_R$, a parabolic curve of the film thickness toward the center is produced, which reaches a maximum value $S_M$ exactly in the region of the middle, which value corresponds to the desired thickness value plus the sum of the values of the prevailing roller deflections:

$$S_M = S_R + 2f,$$

where f=the deflection of a calender roller when identical calender rollers are being used.

In order to counteract this problem in connection with the device shown in the drawings, the thickness profile according to FIG. 8 is continuously measured across the width of the film by a thickness measuring device, which is not shown here, but is commercially available and also known in this regard, for example, when the film exits the calender stack once again and a thickness profile is produced based on the measurement data obtained.

A control unit, which is supplied with the determined measurement values of the thickness measurement profile, then calculates a correction value $S_D$ based on the values for $S_M$ and $S_R$ according to the following formula:

$$S_D = \frac{S_M - S_R}{2}$$

By the second adjusting systems 9a, which have already been explained above, in the region of the bearing of the adjusting roller 15, it is then possible to determine an axial offset of the rotation axis R2 of the adjusting roller 15 relative to the rotation axis R3 of the stationary roller 3 in a second plane E2 that is shown in FIG. 6 and that extends perpendicularly to a first plane E1 in which the adjustment of the nip 4 between the stationary roller 3 and the advancing roller 15 is produced. In this connection, as is clear from FIG. 7, the axial offsetting of the advancing roller 15 is achieved if one of the bearings is moved by a correction value $-\Delta_Y$ in the one direction within the plane E2, in this case downward, and at the end bearing at the opposite end, is moved by the same value $+\Delta_Y$ in the opposite direction, in the upward direction in this case.

Figure 7:
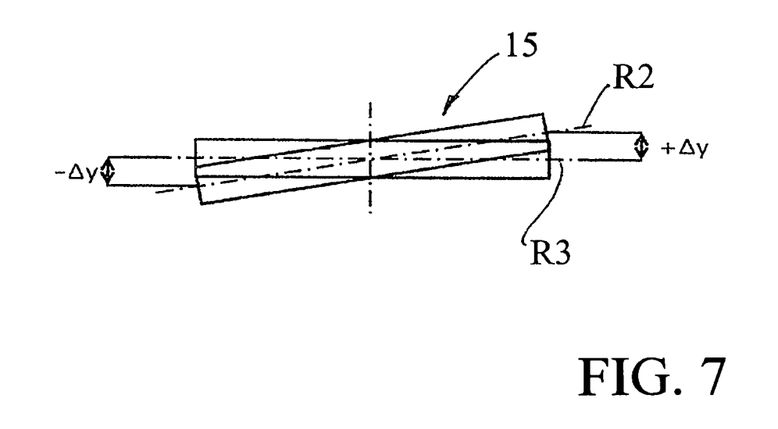
FIG. 7 shows an axial offset of the advancing roller according to FIG. 6.

The magnitude of the travel distance used $\Delta_Y$ can be calculated based on the following formula:

$$\pm \Delta_Y = \sqrt{S_D(dw - S_D)},$$

where dw indicates the diameter of the calender roller 15.

Correspondingly, the second adjusting drives 9a, which are visible in FIG. 5b and are situated so that they are rotated by 90° relative to the first adjusting systems 9 that adjust the nip, are correspondingly controlled in order to adapt the movement of the bearings at one end by the correction values $\pm \Delta_Y$ in accordance with FIG. 7.

Because of the axial offsetting of the advancing roller relative to the stationary roller executed in this way, the previously inevitable disruption of the thickness profile of the produced film that was induced by the roller deflection can be almost completely eliminated, making it possible to achieve a considerable savings of raw materials and correspondingly improved thickness tolerance in the film that is obtained. An extremely uniform thickness profile is produced, specifically even in large web widths, with a considerably lower rejection rate and significant reduction in waste.

Because the thickness profile is significantly more uniform, it is possible to achieve a greater precision in adjusting the nip and particularly in the transmission of calendering forces between the rollers 2, 3, and 15, thus also significantly reducing the setup and changeover times when performing product changeovers.

The invention claimed is:

1. A calender stack (1) for producing a film of thermoplastic materials, including at least two rollers (2, 3, 15) between which a nip (4, 4') is provided to form the film; ends of the rollers (2, 3, 15) supported in rotary fashion in bearings (5, 6, 7, 8, 18, 19) and one of the rollers (3) stationary and at least one other roller (2, 15) being an advancing roller and having a first adjusting system (9) by which it is possible to move the bearings (5, 6, 18, 19) of the advancing roller, thus changing the nip (4, 4'), and a film thickness measuring apparatus adapted to determine a thickness profile across a width of the film; the calender stack comprising the advancing roller having a respective first adjusting system (9) at each of its two bearings (5, 6, 18, 19) and associated with each first adjusting system (9), a second adjusting system (9a) by which it is possible to adjust an axial offset of the advancing roller relative to the stationary roller (3), and a control device in combination with the first adjusting system (9) and the second adjusting system (9a), wherein the control device determines correlation values for the axial offset from measurement values of the film thickness measuring apparatus and drives the second adjustment system (9a) as a function of the correlation values;

wherein the first and/or the second adjusting system (9, 9a) has a rack (10) and a pinion (11) with pinion teeth engaging with rack teeth of the rack and can be driven to rotate by a motor (12), and it is possible to change a distance between the pinion (11) and the rack (10) by changing a tooth engagement depth between them.

2. The calender stack (1) according to claim 1, wherein the second adjusting system (9a) is offset by 90° relative to the first adjusting system (9).

3. The calender stack (1) according to claim 1, wherein the distance between the pinion (11) and the rack (10) is changed by a cam mechanism acting on the pinion (11).

4. The calender stack (1) according to claim 3, wherein the distance between the pinion (11) and the rack (10) is releasably fixable.

5. The calender stack (1) according to claim 4, wherein the first and/or the second adjusting systems (9, 9*a*) of the advancing roller are centrally controllable.

6. The calender stack (1) according to claim 5, wherein a transmission (14) is provided between the pinion (11) and the motor (12) of the first and/or the second adjusting system (9, 9*a*).

7. The calender stack (1) according to claim 6, wherein the transmission (14) is embodied as a planetary gear.

8. The calender stack (1) according to claim 7, wherein the motor (12) is a servomotor.

9. The calender stack (1) according to claim 8, wherein three rollers (2, 3, 15) are provided, of which two rollers (2, 15) are embodied as advancing rollers.

10. The calender stack (1) according to claim 1, wherein the distance between the pinion (11) and the rack (10) is releasably fixable.

11. The calender stack (1) according to claim 1, wherein the first and/or the second adjusting systems (9, 9*a*) of the advancing roller are centrally controllable.

12. The calender stack (1) according to claim 1, wherein a transmission (14) is provided between the pinion (11) and the motor (12) of the first and/or the second adjusting system (9, 9*a*).

13. The calender stack (1) according to claim 12, wherein the transmission (14) is embodied as a planetary gear.

14. The calender stack (1) according to claim 1, wherein the motor (12) is a servomotor.

15. The calender stack (1) according to claim 1, wherein three rollers (2, 3, 15) are provided, of which two rollers (2, 15) are embodied as advancing rollers.

16. A method for producing a film from a thermoplastic molten mass with the calender stack (1) according to claim 1, wherein the at least two rotating rollers (2, 3, 15) are adjustable in a spacing distance from each other in a first plane (E1), between which the nip (4, 4') is formed that can be adjusted as a function of the spacing distance of the rollers, and the molten mass is conveyed through the nip (4, 4') and as a result, is shaped into the film and cooled, the method including measuring a thickness of the film obtained across the width and a thickness measurement profile of the film is established, which is compared to a predetermined setpoint value and depending on the measured deviation of the thickness measurement profile from the setpoint value, one of the rollers (15) is offset with regard to a first rotation axis (R2) relative to a second rotation axis (R3) of the opposite other roller (3) in the nip (4) in a second plane (E2) that extends perpendicular to the first plane (E1).

17. The method according to claim 16, wherein at their ends, the rollers (2, 3, 15) are supported in rotary fashion in bearings (5, 6, 7, 8, 18, 19) and as the roller (15) is offset, its bearings (18, 19) are moved from a home position in which the first and the second rotation axes (R2, R3) of the roller (15) and the other roller (3) extend parallel to each other in opposite directions from each other in the second plane (E2).

18. The method according to claim 16, wherein a travel path of ±30 mm is provided for each of the bearings (18, 19).

* * * * *